US007941740B2

(12) United States Patent
Jaiswal et al.

(10) Patent No.: US 7,941,740 B2
(45) Date of Patent: May 10, 2011

(54) AUTOMATICALLY FETCHING WEB CONTENT WITH USER ASSISTANCE

(75) Inventors: Amit Jaiswal, Delhi (IN); Arup Malakar, Guwahati (IN); Binu Raj, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 895 days.

(21) Appl. No.: 11/853,688

(22) Filed: Sep. 11, 2007

(65) Prior Publication Data

US 2009/0019354 A1 Jan. 15, 2009

(30) Foreign Application Priority Data

Jul. 10, 2007 (IN) .......................... 1455/DEL/2007

(51) Int. Cl.
*G06F 17/00* (2006.01)

(52) U.S. Cl. ........................................ 715/205

(58) Field of Classification Search .................. 715/205, 715/206

See application file for complete search history.

(56) References Cited

U.S. PATENT DOCUMENTS

| | | | | |
|---|---|---|---|---|
| 6,560,592 | B1 * | 5/2003 | Reid et al. | 1/1 |
| 7,016,898 | B1 * | 3/2006 | Forlenza et al. | 709/225 |
| 7,552,199 | B2 * | 6/2009 | Pomerantz | 709/219 |
| 7,676,368 | B2 * | 3/2010 | Shizuka et al. | 704/260 |
| 2002/0091565 | A1 * | 7/2002 | Lee | 705/14 |
| 2002/0152237 | A1 * | 10/2002 | Cohen et al. | 707/513 |
| 2002/0196273 | A1 * | 12/2002 | Krause | 345/738 |
| 2003/0033405 | A1 * | 2/2003 | Perdon et al. | 709/224 |
| 2003/0074400 | A1 * | 4/2003 | Brooks et al. | 709/203 |
| 2004/0107137 | A1 * | 6/2004 | Skinner | 705/14 |
| 2004/0158631 | A1 * | 8/2004 | Chang et al. | 709/224 |
| 2004/0210829 | A1 * | 10/2004 | Cristofari et al. | 715/501.1 |
| 2005/0038708 | A1 * | 2/2005 | Wu | 705/26 |
| 2005/0235224 | A1 * | 10/2005 | Arend et al. | 715/792 |
| 2006/0224624 | A1 * | 10/2006 | Korn et al. | 707/104.1 |
| 2006/0224938 | A1 * | 10/2006 | Fikes et al. | 715/500 |
| 2008/0046429 | A1 * | 2/2008 | Punera et al. | 707/7 |
| 2008/0140758 | A1 * | 6/2008 | Lee et al. | 709/201 |
| 2009/0019020 | A1 * | 1/2009 | Dhillon et al. | 707/4 |
| 2010/0088370 | A1 * | 4/2010 | Wu et al. | 709/203 |
| 2010/0146054 | A1 * | 6/2010 | Armstrong et al. | 709/205 |

OTHER PUBLICATIONS

NKweteyim, A Collaborative Filetering Approach to Predict Web Pages of Interest from Navigation Patterns of Past Users within an Academic Website, ProQuest 2005, pp. 1-154.*
Dalamagas et al., Mining User Navigation Patterns for Personalizing Topic Directories, ACM 2007, pp. 81-88.*
Smith et al., Web Page Clustering Using a Self-organizing Map of User Navigation Patterns, Google 2003, pp. 245-256.*
Cooley et al., Grouping Web Page References into Transactions for Mining World Wide Web Browsing Patterns, IEEE 1997, pp. 1-8.*
Eirinaki et al., Web Personalization Integrating Content Semantics and Navigational Patterns, ACM 2004, pp. 72-79.*

* cited by examiner

*Primary Examiner* — Cong-Lac Huynh
(74) *Attorney, Agent, or Firm* — Hickman Palermo Truong & Becker

(57) ABSTRACT

A method for performing activities on a web site is disclosed. A user's browsing activities on a web site are captured. The user's browsing activities includes affixing labels to web pages and filling out forms. The captured activities are analyzed for patterns. Rules for performing activities on a web site are generated based on the patterns. Further activities are performed on the web site according to the rules and content from the web site is fetched. The fetched content is used in various web service applications, including crawlers.

14 Claims, 5 Drawing Sheets

AUTOMATICALLY FETCHING WEB CONTENT WITH USER ASSISTANCE

CROSS-REFERENCES TO RELATED APPLICATIONS

This application is related to and claims the benefit of priority from Indian Patent Application No. 1455/DEL/2007 filed by Jaiswal et al. in India on Jul. 10, 2007, entitled "Techniques for Automatically Fetching Web Content with User Assistance"; the entire content of which is incorporated by this reference for all purposes as if fully disclosed herein.

The present invention is related to U.S. patent application Ser. No. 11/762,618, filed Jun. 13, 2007, titled "Intelligent Form Filler" to Raj, et al., assigned to Yahoo, Inc. in Sunnyvale, Calif., and which is incorporated by reference herein.

FIELD OF THE INVENTION

The present invention relates to computer networks and, more particularly, to techniques for automatically fetching content from the World Wide Web based on previously captured user activities.

BACKGROUND

The Internet is a worldwide system of computer networks and is a public, self-sustaining facility that is accessible to tens of millions of people worldwide. The most widely used part of the Internet is the World Wide Web, often abbreviated "WWW" or simply referred to as "the Web." The Web organizes information through the use of hypermedia. The HyperText Markup Language ("HTML") is typically used to specify the contents and format of a hypermedia document (e.g., a web page).

A web page is the image or collection of images that is displayed to a user when the web page's HTML file is rendered by a browser application program. Each web page can contain embedded references to resources such as images, audio, video, documents, or other web pages. On the Web, the most common type of reference used to identify and locate resources is the Uniform Resource Locator, or URL. A user using a web browser can reach resources that are embedded in the web page being browsed by selecting "hyperlinks" or "links" on the web page that identify the resources through the resources' URLs.

A web page can be static or dynamic. Static web content generally refers to web content that is fixed and not capable of action or change. A web site that is static can only supply information that is written into the HTML source code and this information will not change unless the change is written into the source code. In contrast, a dynamic web page contains dynamically-generated content that is returned by a server based on a user's request, such as information that is stored in a database associated with the server. The user can request that information be retrieved from a database based on user input parameters. The most common mechanisms for providing input for a dynamic web page in order to retrieve dynamic web content are HTML forms and Java Script links.

Because the Web provides access to millions of pages of information that are often poorly organized, it can be difficult for users to locate particular web pages that contain the information that is of interest to them. To address this problem, a mechanism known as a "search engine" has been developed to index a large number of web pages and to provide an interface that can be used to search the indexed information by entering certain words or phrases (keywords) to be queried. Although there are many popular Internet search engines, they generally include a "web crawler" (also referred to as "crawler", "spider", "robot") that "crawls" across the Internet in a methodical and automated manner to locate Web pages around the world.

There are two common types of "crawling". In free crawling, when a crawler locates a document, the crawler stores the document and the document's URL, and follows any and all links embedded within that document to locate other web pages. In focused crawling, the crawler tries to crawl only those web pages which contain a specific type of content, or "relevant" web pages.

Although various methods exist for focused crawling, such as the techniques described in U.S. Pat. No. 6,418,433 ("System and Method for Focused Web Crawling"), the crawler may still crawl many irrelevant web pages or miss relevant web pages for a variety of reasons. One reason is that there is a great amount of diversity and variation among web pages in terms of design and structure. Thus, it is very difficult for a focused crawler, which determines which web pages to crawl based on a single set of logic or rules, to accurately ascertain the relevant web pages across a very broad spectrum of web pages. Another reason is that one basic assumption used in focused crawlers, that web pages that contain a specific type of content are linked to each other, is often untrue. Based on this assumption, focused crawlers do not follow any links from a web page which does not contain the specific type of content, and as a result often fail to crawl relevant web pages that are located further along a chain of links. Forms on Web pages also pose difficulties for a focused crawler. Often, it is necessary to fill out a form, such as a search form for job listings, in order to access the relevant web content, such as the job listings and job descriptions. However, due to the immense diversity of forms that exist on the Web, even focused crawlers that apply intelligence in filling out forms are limited and cannot retrieve all relevant content. Other problems with existing focused crawlers include lack of access to restricted content and crawling Web pages in an unnatural or illogical order.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

OVERVIEW

Figure 1:
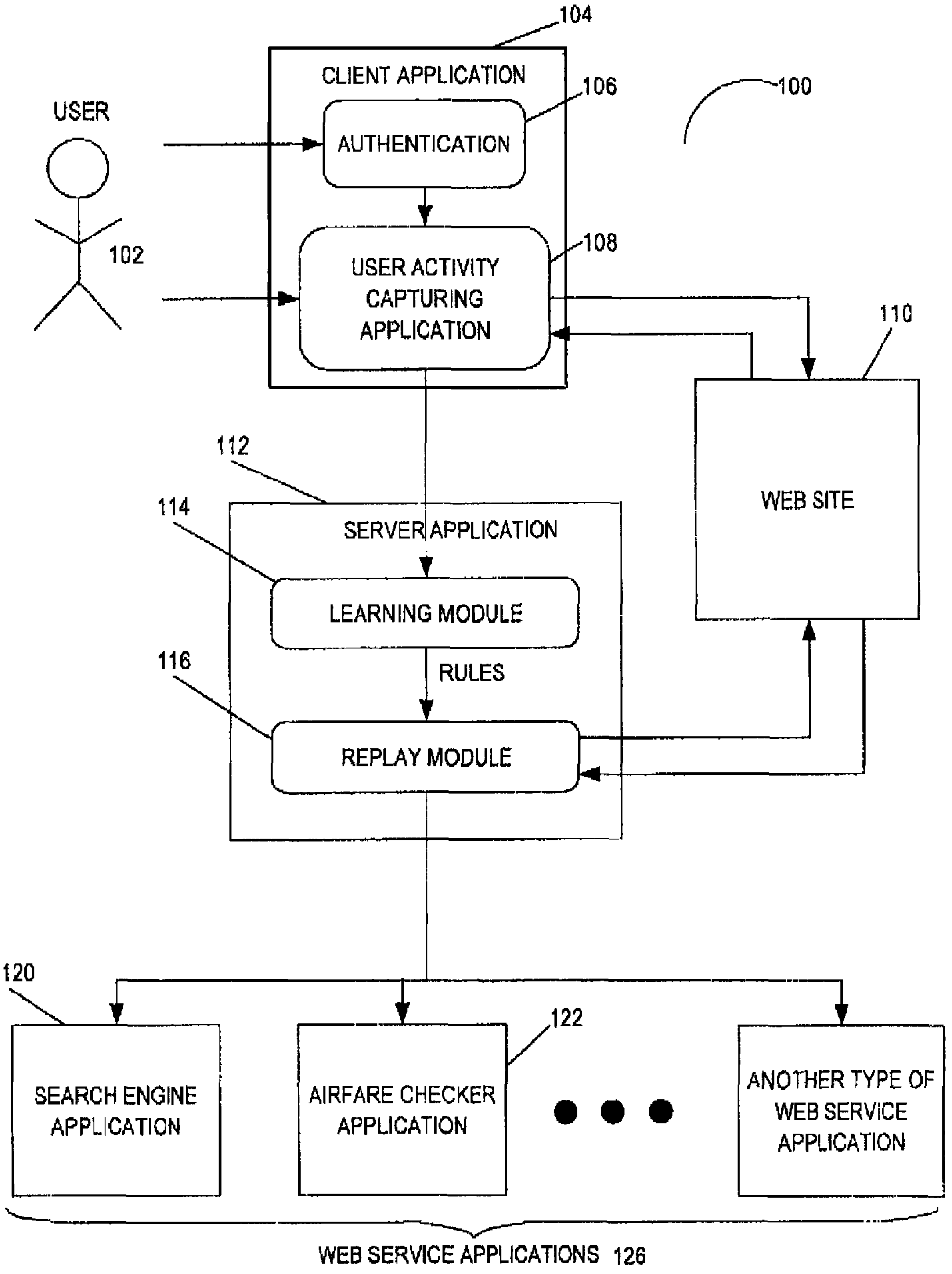
FIG. 1 is a diagram that illustrates an example of a system for automatically performing activities on a web site based on previously captured user activities.

Techniques are provided for performing activities on a web site based on rules that are generated by learning a user's previously captured browsing activities. In the context of crawling, a web crawler learns from a user which web pages are most likely to be relevant, which web pages are least likely to be relevant, and how to best fill out forms. The web crawler then applies this learning in making decisions about which web pages to crawl and how to fetch content from dynamic web pages, such that those that are generated as a result of a form submission. These techniques may also be used in many other applications not related to web crawling. Any application which automatically performs activities on a web site, such as fetching web content, based on a set of rules which are generated from a user's previous browsing activities can employ the techniques described herein. Examples will be described in further detail below.

In one embodiment, a user browses a web site using a client application that records the user's browsing activities. The client application has a visual display interface similar to standard web browsers such as Microsoft Explorer and Mozilla Firefox. In addition, the client application also stores the user's browsing activities, such as requests for web pages, form-filling input, and clicks on particular parts of the web page being browsed. The client application then sends the stored activities to a server, where a server application analyzes and performs learning on the stored activities. Based on this learning, the server application generates rules for performing activities on the web site. Finally, the server application initiates a "replay" session where activities are performed on the web site based on these rules.

In one embodiment, the client application also provides a way for the user to label web pages during browsing. These labels are stored in a similar fashion as the rest of the user's browsing activities and are forwarded to the server. At the server, the server application analyzes these labels to learn about which web pages are relevant and to further refine rules generated for "replay".

In one embodiment, the client application provides an intelligent form-filler, which enables a user to fill out a form with multiple values without having to enter each value manually.

According to one technique, during the "replay" step, a crawler application fetches web content based on rules learned from user browsing activities and provides the crawled content to a search engine.

According to another technique, during the "replay" step, a web service application performs activities on a web site based on rules learned from a user's previously captured activities and provides updated web content to the user. For example, the web service application can periodically perform a search for air fares, based on a search that a user has previously performed, and provide these periodic updates to the user.

The techniques described above can also be applied to entities other than web pages, such as sites and domains. These techniques, and variations and extensions of these techniques, are described in greater detail below.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Process for Fetching Web Content Based on User Assistance

As discussed above, Web content may be fetched more effectively if automatic fetching activities are performed based at least in part on the fetching activities previously performed by a user. The captured activities may include clicking on a URL, clicking on a button, selecting a value from a drop-down menu, etc. In one embodiment of the invention, the fetching activities of a user are captured by a client application which resides on the user's computing device. The captured activities are then sent to a server, where a server application analyzes the activities for patterns. The server application then generates rules for automatically performing activities on the Web which are similar to the activities performed by the target user. Using these rules, the server application performs a series of activities on the Web, retrieves a set of content from the Web, and relays the retrieved content to other web service applications for further processing.

Although the application that captures a user's activities has been described in the above embodiment as residing on a client's device, in alternative embodiments of the invention, this application may reside on any computing device that communicates with the user, such as a proxy server. Which kind of user activities can be captured may depend on where the user activity capturing application resides. For example, if the user activity capturing application resides on a proxy server, information such as URLs requested by the user and the accompanying request headers may be captured. If the user activity capturing application resides on the user's computing device, additional information such as the user's button clicks and typed text may also be captured.

FIG. 1 is a diagram that illustrates an example of a system 100 that implements the process just described. User 102 is the user who is using the system to browse through web pages on a web site 110. "Browsing" includes activities such as requesting web pages, filling out and submitting forms on web pages, and interacting with user interfaces on web pages. User 102 can be one of several types of users. User 102 may be a web master who wishes to use the system 100 to inform a web crawler about how his web site 110 is most effectively crawled. The web master uses the system 100 to browse the web pages on his web site 110 in a certain order, fill out forms on the web site 110, and interact with the web pages from web site 110 in a manner intended by the web master. The system 100 captures these activities and generates rules for crawling the web site 110 by performing learning on the captured activities. The rules are then used by a web crawler to crawl web site 110.

User 102 may also be a manual reviewer who is working in conjunction with a web crawler to improve crawling of relevant web pages. For example, the manual reviewer wishes to improve the crawling of web pages on a well-known web site containing a large database of job listings, such as "http://hotjobs<DOT>yahoo<DOT>com". The manual reviewer's activities on this web site, such as following links in a logical manner and filling out search forms, establish the basis from which rules can be learned for requesting web pages and filling out forms on the web site. A crawler application then uses these rules to more effectively crawl the web site and to retrieve more relevant web pages containing job listings.

Finally, user 102 may be a user who wishes to have web content from a web site 110 automatically fetched and delivered to him, based on a series of activities he has previously performed. More detailed examples of this are discussed below.

User 102 interacts with client application 104, which resides on a computer device at user 102's location. Client application 104 includes an authentication module 106 and a user activity capturing application 108. User 102 provides an ID and optionally a password to the authentication module 106. The authentication module 106 uses the ID and password, if provided, to verify that target user 102 has permission to proceed. To perform this verification, authentication module 106 may communicate with a server that stores a list of user IDs and associated permissions. Identification of users can be used to ensure that a user has the permission to provide his web browsing activities as a basis for learning, such as in the case where the user is a web master or a manual reviewer. Identification of users can also be used to provide customized web content on a per-user basis, such as providing updated web content from a dynamic web site based on a user's previous activities on that web site.

Once user 102 has been authenticated, the user proceeds to browse a web site 110 through the user activity capturing application 108. The user activity capturing application 108 provides the user 102 with a visual interface for browsing similar to a standard web browser such as Microsoft Internet Explorer and Mozilla Firefox. The user 102's requests for web pages and other input, such as form submissions, are sent over a network interface to web site 110, as in standard web browsing. As in standard web browsing, content fetched from web site 110 is displayed by the user activity capturing application 108 to the user 102 to facilitate further browsing. In addition, all of the user 102's activities, including requests for web pages, form submissions, and activities on a particular web page, are captured by user activity capturing application 108 and sent to server application 112. Further details regarding the user activity capturing application are provided in another section below.

Server application 112 resides on a server connected over a network to the user 102's computing device. The user 102's web activities as captured by the user activity capturing module are received by server application 112 for analysis and processing. Server application 112 contains a learning module 114, that analyzes the captured activities and generates rules based on the captured activities. Significantly, the rules generated by learning module 114 do not simply repeat the user 102's activities; rather, the rules expand beyond the captured activities to perform further activities that the user 102 may not have performed. For example, a web page contains many links, divided into three categories. In a job listings web page, category 1 may contain links that point to web pages containing job descriptions, category 2 may contain links that point to web pages in non-job-related sections of a web site, and category 3 may contain links that point to the web site's homepage. The captured activities indicate that the user 102 visited some links in category 1, but did not visit any of the links in category 2 or 3. Based on this, the learning module may generate a rule to visit all the links in category 1 because there is a high probability that the links in category 1 are relevant to the target user 102, even though the target user 102 himself did not actually visit all of the links in that category. Further examples of learning are discussed in more detail below.

Once the learning module 114 has generated a set of rules, the rules are sent to a replay module 116, which is also part of the server application 112. The replay module 116 fetches content from the web site 110 based on the rules received. The replay module 116 can request and load a web page like a standard browser, but can also emulate user activities like clicking on a link or button on a web page, filling in values on a form, and executing a Java script. In short, the replay module 116 is capable of performing any activities on a web page that can be performed by a human user.

The content fetched by the replay module 116 can be used by a variety of web service applications, such as search engine application 120 and airfare checker application 122. More details about these web service applications are discussed further below.

User Activity Capturing Application

The user activity capturing application is the main part of the client application, and captures all activities performed by a user when the user browses through a web site. Examples of such activities include: entering values in a text box in a form, submitting a form, clicking on a link, button, or image, selecting a value from a drop-down box, selecting a tab, and typing a URL address. The captured activities are analyzed for patterns from which rules for automatic web content fetching are generated.

Figure 2:
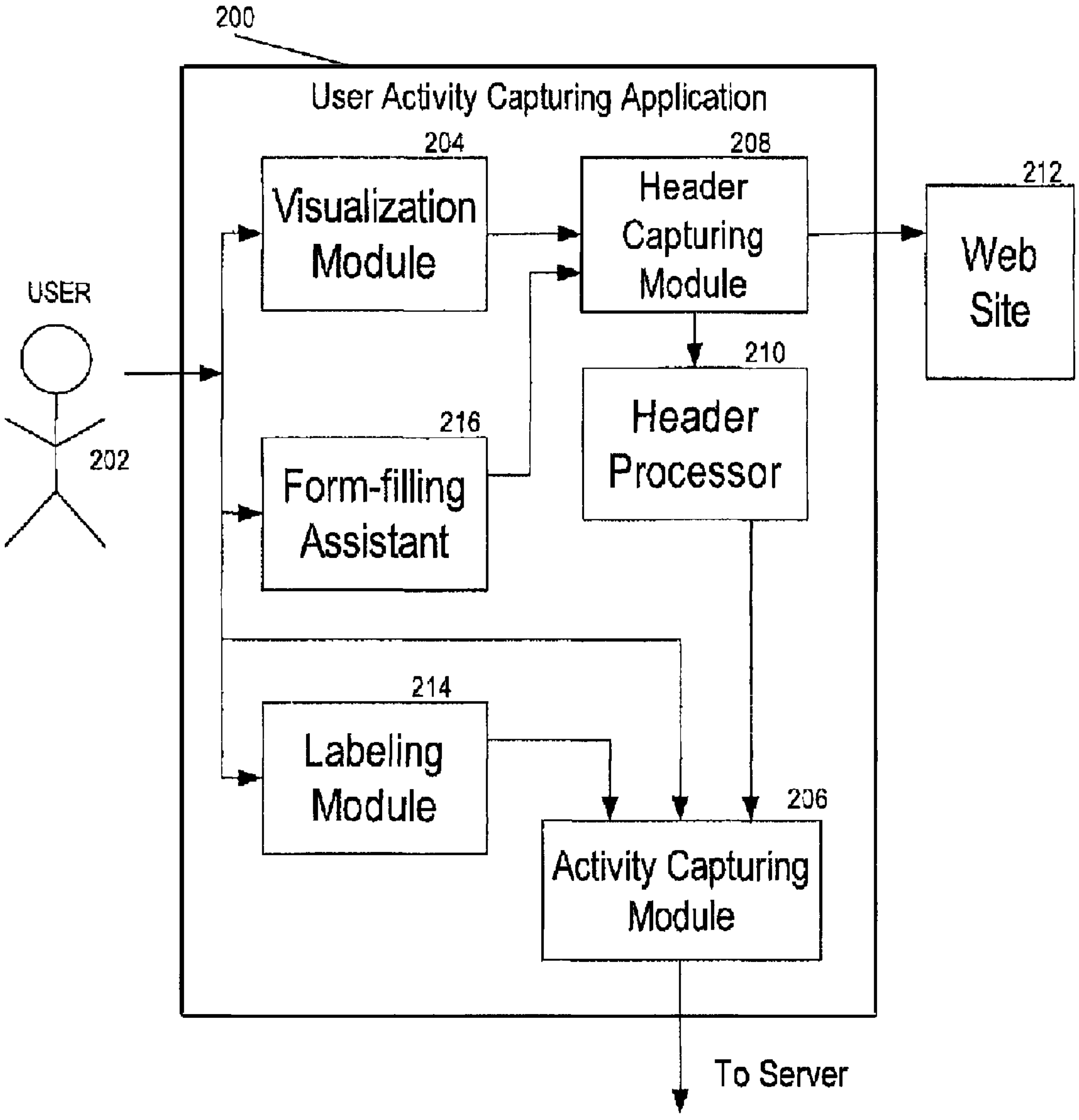
FIG. 2 is a diagram that illustrates an example of a user activity capturing application.

FIG. 2 is a diagram that illustrates an example of a user activity capturing application 200. Note that user activity capturing application 200 in FIG. 2 is a detailed illustration of user activity capturing application 108 in FIG. 1. In FIG. 2, user 202 interacts with the user activity application 200 to browse a web site 212. The user activity capturing application 200 contains a visualization module 204, which displays a web page to the user 202. The visualization module 204 provides the user 202 with the functionality of a standard web browser, allowing user 202 to click on links, submit forms, type in URLs, and perform any other activities that can be performed in a standard web browser. These activities are captured by an activity capturing module 206. The activity capturing module 206 captures the exact sequence of user 202's activities while he interacts with visualization module 204. These captured activities are then sent to the server for analysis and learning.

Other modules in the user activity capturing application capture certain specific activities performed by user 202. For example, when user 202 requests a new web page from web site 212, such as by typing in a URL or clicking on a link in the web page currently being browsed, a request header is generated and sent to the web site 212. The request header is captured by the header capture module 208, and contains information such as URL, post parameters, and cookies. This information is analyzed and extracted by header processor module 210. The output of header processor module 210 is then aggregated with other captured activities for sending to the server. In one embodiment, the files uploaded by user 102 to web site 110, which form part of the request header, are stored so that replay module 116 may later retrieve the stored files to perform similar uploads.

Figure 3:
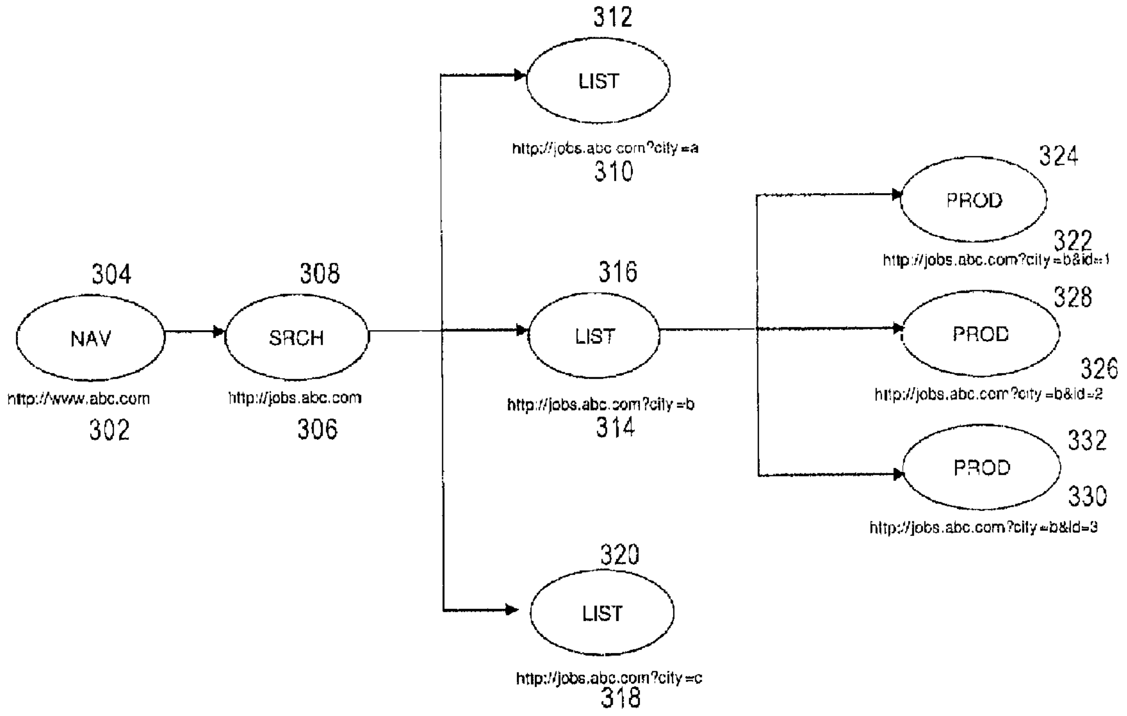
FIG. 3 is a diagram that illustrates an example of a series of linked web pages and the web pages' user-designated labels.

In one embodiment, user 202 generates activities through the labeling module 214. While the user 202 is browsing a web page on visualization module 204, he uses labeling module 214 to label the web page with one or more labels. The labels may be pre-defined or created by the user. FIG. 3 illustrates an example of a series of linked web pages which have been labeled by a user. In this example, a user browses a web site for jobs, and may label a web page with one of four possible labels: "NAV," "SRCH," "LIST," and "PROD." A "NAV" label denotes a navigation page, which is a web page which is in the browse path to a page with job description or job listings. Here, the user is browsing through the web page 302, which has the URL "http://www<DOT>abc<DOT>com". The user determines that this web page does not contain any job listings or descriptions and is simply a web page that is used to navigate to more specific job-related web pages. Therefore, the user labels the web page 302 with the "NAV" label 304. A "SRCH" label denotes a web page that contains a search form, which can be filled out to search for jobs. Web page 306, which has the URL "http://jobs<DOT>abc<DOT>com", contains such a search form. When browsing this page, the user labels web page 306 with the "SRCH" label 308. Next, the user browses to a web page such as web page 310, which has the URL "http://jobs<DOT>abc<DOT>com?city=a". The user determines that this web page contains a list of jobs which are located in City "a", and labels it with "LIST" label 312. A "LIST" label denotes a listing page, which is a web page that contains a list of jobs. Similarly, the user labels web page 314 with "LIST" label 316 and web page 318 with "LIST" label 320. Finally, a "PROD" label denotes a product page, which is a page that contains a detailed description of a job. From web page 314, which contains a list of jobs in City "b", the user follows three links to reach web pages 322, 326, and 330. These web pages each contains a detailed description of a specific job in City "b", and are therefore each respectively labeled with "PROD" labels 324, 328, and 332. Relating back to FIG. 2, user 202 labels web pages by using the labeling module 214. These labels are in turn relayed to activity capturing module 206 for forwarding to the server. At the server, a learning application analyzes the labels to gather information about the characteristics of web pages on the web site, and uses this information to generate rules for fetching content from the web site.

There are two main ways in which labels can be used to generate rules for fetching Web content. First, the web pages that are labeled with the same labels represent a group of URLs from which a pattern may be derived. For example, in FIG. 3, a rule may be generated from the pattern that URLs which match the regular expression "http://jobs<DOT>abc<DOT>com[?]city=[\w]+" are labeled with the "LIST" label, where "[\w]+" represents a letter or a string of letters. Second, relationships between different kinds of labels may be inferred. For example, in FIG. 3, an analysis of the information captured by the user activity capturing application may result in inference that web pages labeled as "LIST" link to web pages labeled as "PROD". Significantly, relationships between labels may also be used by the learning module to generate rules for fetching Web content.

Figure 4:
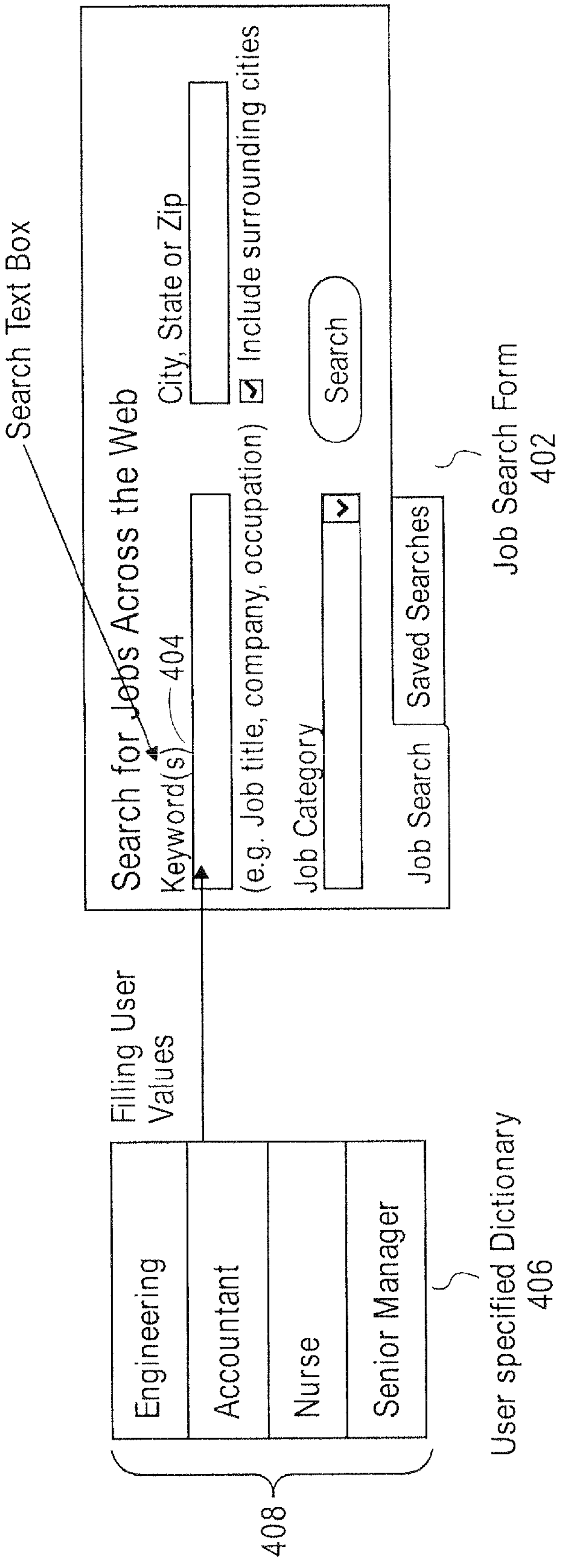
FIG. 4 is a diagram that illustrates an example of using a predefined dictionary to automatically fill in values in a search form.

In another embodiment, the user 202 fills out forms on web pages by using the form-filling assistant module 216. The form-filling assistant module helps a human user, such as user 202, fill out search forms on web pages. For example, in a job search form, there may be a drop-down menu with a hundred city names. To retrieve all the jobs from the web site, each city name must be selected once and submitted. This kind of repetitive form-filling is tedious for a human user to perform. However, user 202 may use the form-filling assistant module 216 to assist him in filling out such forms. User 202 may specify a set of values or dictionaries which the form-filling assistant module 216 uses to fill in values for a form. User 202 may also request the form-filling assistant module 216 to iterate over the values in a drop-down box. In this example, the form-filling assistant can automatically select each of the hundred city names in the job search form's drop-down box and perform one form submission for each selected city name. FIG. 4 depicts another example of how a form-filling assistant module may be used. Job search form 402 is a search form displayed on a web page. Within job search form 402 are search text boxes, one of which is keyword search text box 404. Normally, a human user types in one or more keywords for each search he wishes to perform. For example, if the human user wishes to type in job titles as keywords, then he will need to type in different keywords for each job title he is interested in searching. This is convenient if the user is interested in retrieving job information for only a couple of job titles, but is tedious when used to retrieve information for many job titles. Using the form-filling assistant module, a human user can specify a dictionary 406, which contains a list of dictionary words 408. The form-filling assistant can automatically fill in the list of dictionary words 408 one by one and perform a form submission for each of the dictionary words without further input from the user. The same dictionary may be used for another job search form, or may be used for the same job search form at a later time. Further details about the form-filling assistant can be found in U.S. patent application Ser. No. 11/762,618, filed Jun. 13, 2007, titled "Intelligent Form Filler" to Raj, et al., assigned to Yahoo, Inc. in Sunnyvale, Calif., and which has been incorporated by reference herein. User 202's input to the form-filling assistant 216 is relayed to activity capturing module 206, so that learning can be performed on the user's form-filling parameters. For example, the user specified dictionary 406 in FIG. 4 can be submitted to activity capturing module 206 for forwarding to the server.

Learning and Replaying

The learning module 114 is part of the server application 112 on the client server, as illustrated in FIG. 1. Learning module 114 receives the information captured by the user activity capturing application 108 and performs learning on the information to generate rules for performing further activities. Specifically, the learning module analyzes information about a user's captured activities on a web site to determine any patterns in the activities and, based on these patterns, generates one or more rules for performing future activities on the web site according to these patterns. In one example, the user activity capturing application 108 sends the learning module 114 information about a user's activities with regard to web pages on a job web site. Specifically, the user has labeled certain web pages with the label "PROD", indicating that the labeled web pages contain specific job descriptions. These web pages have the following URLS:

http://jobs<DOT>abc<DOT>com?city=ca&id=100
http://jobs<DOT>abc<DOT>com?city=ca&id=101
http://jobs<DOT>abc<DOT>com?city=ca&id=102
http://jobs<DOT>abc<DOT>com?city=ca&id=103

From this information, the learning module 114 learns a pattern in the URLs. The pattern is that the "id=100" portion of the URL changes while the rest of the URL remains among these web pages. The learning module 114 then generates a rule where web pages with URLs with the common portion but with a different "id=100" portion are crawled for searches for job descriptions. For example, a web page containing the URL "http://jobs<DOT>abc<DOT>com?city=ca&id=104" is crawled based on the rule just generated. This web page is crawled even though the user has never previously browsed it because its URL is consistent with a pattern determined by the learning module 114.

Significantly, as just illustrated, the learning module 114 generates rules for performing activities which go beyond simply mirroring what the user has already done. Rather, the learning module 114 uses information about patterns in past user activities to generate rules for performing future activities which conform to the patterns. Thus, activities may be performed based on these learned rules which have never been performed by the user.

Although the above example discusses a pattern in a set of web pages' URLs, the learning module is not restricted to only patterns in URLs. Patterns may be detected in any parameter in a user's captured activities, including the links which are clicked, the values filled in on a firm, and the labels given to web pages.

Based on the rules generated by the learning module, the replay module 116 performs a series of activities on the web site. The replay module 116 is capable of fetching a web page from the web site, clicking on a hyperlink in a web page, and filling in values in a form. Some web sites contain Java script or other types of dynamic content that depends on the user activities. For these sites, the replay module 116 emulates user activities so as to fetch proper content in every step.

Web Service Applications

As discussed above, replay module 116 performs a series of activities, based on rules generated by learning module 114, on web site 110. Content fetched from web site 110 as a result of these activities is received by replay module 116 and forwarded to web service applications 126. Web service applications 126 use the fetched web content to provide information to an end user. The end user may be user 102 in FIG. 1, whose captured browsing activities were used for learning, or an unrelated user. Significantly, content fetched by replay module 116 may contain content from web pages not previously visited by user 102, content from dynamic web pages which have changed since user 102's last visit, or both. The following discussion illustrates examples of web service applications 126.

In one example, the web service application is a search engine application 120, which uses the replay module 116 in conjunction with a standard crawler. The standard crawler crawls most web sites using standard free crawling or focused crawling schemes. For certain web sites, however, the replay module 116 is used instead to crawl the web site. For example, the web site "http://hotjobs<DOT>yahoo<DOT>com" contains job content that is accessible only by filling out forms on the web site, which is a difficult task for a standard crawler. Therefore, a manual reviewer browses through the web site using system 110, where the manual reviewer's browsing activities, including form filling activities, are captured. Learning module 114 analyzes the captured activities and generates rules for replay module 116. Replay module 116 then crawls the web site based on the generated rules and effectively fetches job content from the web site. Finally, the search engine application utilizes content fetched by both the standard crawler and replay module 116 to provide the end user with search results responsive to the end user's search queries.

In another example, the web service application is an airfare checker application 122. User 102 browses a web site 110, which in this example contains content on current air fares. User 102 submits a search form on the web site 110 to search for fares from City X to City Y for the upcoming month. This search is captured and may be repeated by replay module 116 using updated travel date values. Updated fare information from web site 110 is received by replay module 116 and forwarded to airfare checker application 122, which then sends the updated fares to user 102.

Although this discussion focused on only two examples of web service applications are discussed, similar techniques may be used to support other types of web service applications.

Providing Feedback to the User

In one embodiment, the rules generated by learning module 114 are provided to user 102 for viewing and editing. If user 102 detects that a particular rule is unreasonable or misinterprets the user 102's browsing activities, user 102 may delete or edit the rule. This technique provides a way for a user 102 to directly influence the rules used by the replay module 116 and increases the efficacy of replay module 116's web activities.

Using a Proxy Server in the Replay Module

Certain web sites contain different content depending on the geographic location of the requester. For example, a user in India who types in the URL "http://www<DOT>yahoo<DOT>com" may retrieve a web page different from a web page retrieved by a user in the U.S. who types in the exact same URL. If a user 102 uses system 100 to browse a web site in a first geographic location, but the replay module 116 resides on a server located in a second geographic location, then the content retrieved by the replay module 116 may be very different from the content that the user 102 browsed.

In one embodiment, the replay module 116 further includes a proxy server which has the same geographic location as the user 102, so that the same web site is browsed by both user 102 and replay module 116.

Hardware Overview

Figure 5:
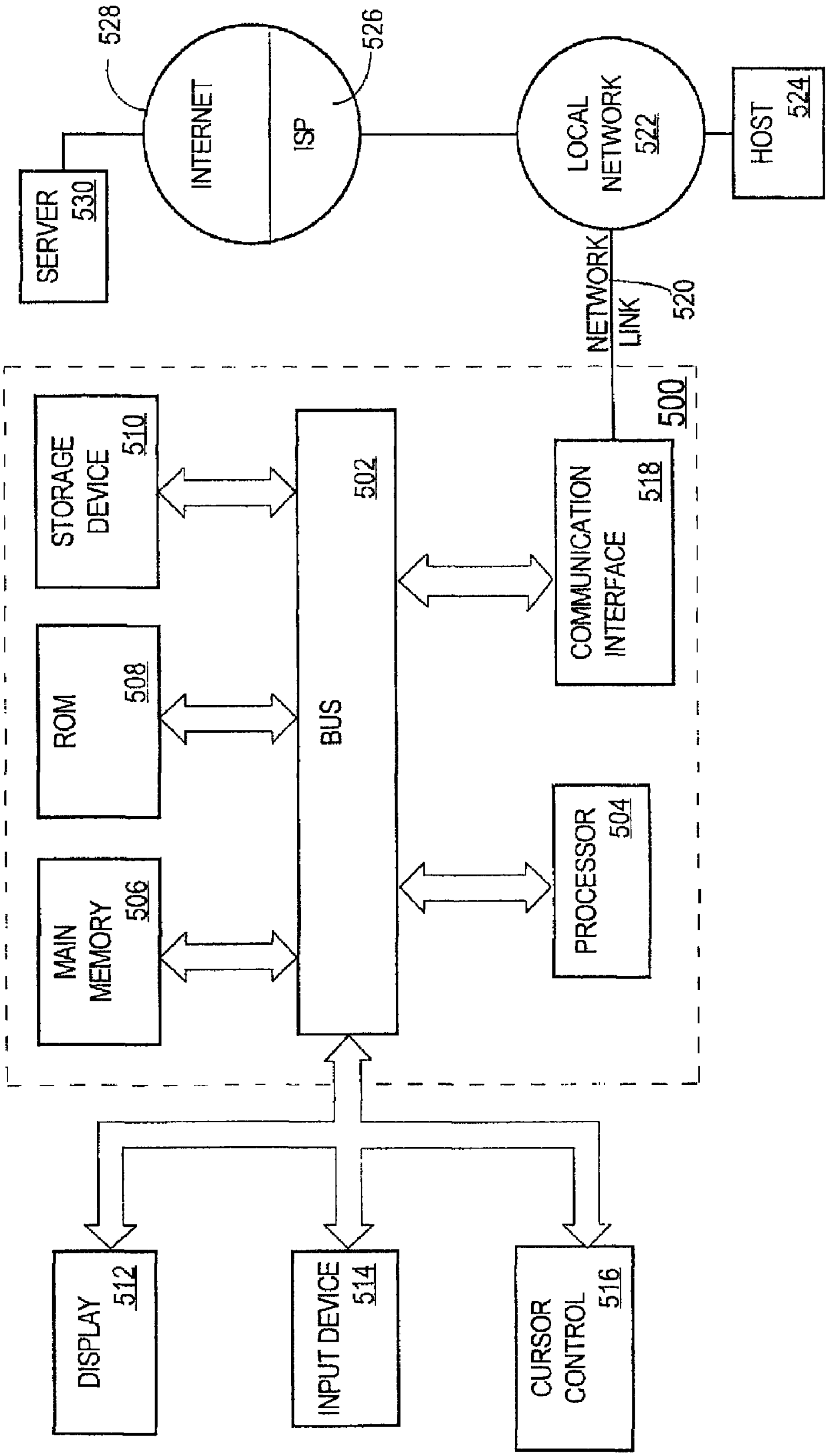
FIG. 5 is a block diagram of a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 604 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for performing activities on the Web, the computer-implemented method comprising:

receiving data corresponding to a first series of activities performed by a user in response to content on a web site;

analyzing the data to determine patterns in the first series of activities;

based on the patterns, generating at least one rule for performing activities on the web site which conform to the patterns;

based on the at least one rule, performing a second series of activities on the web site;

wherein the data corresponding to the first series of activities further comprises user-assigned labels associated with web pages on the web site.

2. A computer-implemented method for performing activities on the Web, the computer-implemented method comprising:

receiving data corresponding to a first series of activities performed by a user in response to content on a web site;

analyzing the data to determine patterns in the first series of activities;

based on the patterns, generating at least one rule for performing activities on the web site which conform to the patterns;

based on the at least one rule, performing a second series of activities on the web site;

receiving, in response to the second series of activities on the web site, content from the web site; and delivering the content to a search engine that has indexed web pages and that provides an interface usable to search said indexed web pages based on queries.

3. The computer-implemented method of claim 2, wherein the data corresponding to the first series of activities further comprises request headers sent to the web site.

4. The computer-implemented method of claim 2, wherein the data corresponding to the first series of activities further comprises parameters provided by the user to a form-filling assistant, wherein the form-filling assistant is an application that automatically generates values for forms on the web site based on the parameters.

5. The computer-implemented method of claim 2, further comprising:

delivering the content to a web service application.

6. The computer-implemented method of claim 2, further comprising:

delivering to the user the at least one rule; and in response to feedback input from the user, modifying the at least one rule.

7. The computer-implemented method of claim 2, wherein the step of performing a second series of activities on the web site further comprises:

utilizing a location proxy to perform the second series of activities from the location of the user.

8. A non-transitory computer-readable storage medium storing instructions for performing activities on the Web, wherein the instructions include instructions which, when executed by one or more processors, cause the one or more processors to perform the steps of:

receiving data corresponding to a first series of activities performed by a user in response to content on a web site;

analyzing the data to determine patterns in the first series of activities;

based on the patterns, generating at least one rule for performing activities on the web site which conform to the patterns; and based on the at least one rule, performing a second series of activities on the web site;

wherein the data corresponding to the first series of activities further comprises user-assigned labels associated with web pages on the web site.

9. A non-transitory computer-readable storage medium storing instructions for performing activities on the Web, wherein the instructions include instructions which, when executed by one or more processors, cause the one or more processors to perform the steps of:

receiving data corresponding to a first series of activities performed by a user in response to content on a web site;

analyzing the data to determine patterns in the first series of activities;

based on the patterns, generating at least one rule for performing activities on the web site which conform to the patterns; and based on the at least one rule, performing a second series of activities on the web site;

receiving, in response to the second series of activities on the web site, content from the web site; and delivering the content to a search engine that has indexed web pages and that provides an interface usable to search said indexed web pages based on queries.

10. The computer-readable storage medium of claim 9, wherein the data corresponding to the first series of activities further comprises request headers sent to the web site.

11. The computer-readable storage medium of claim 9, wherein the data corresponding to the first series of activities further comprises parameters provided by the user to a form-filling assistant, wherein the form-filling assistant is an application that automatically generates values for forms on the web site based on the parameters.

12. The computer-readable storage medium of claim 9, said steps further comprising:

delivering the content to a web service application.

13. The computer-readable storage medium of claim 9, said steps further comprising:

delivering to the user the at least one rule; and in response to feedback input from the user, modifying the at least one rule.

14. The computer-readable storage medium of claim 9, wherein the step of performing a second series of activities on the web site further comprises:

utilizing a location proxy to perform the second series of activities from the location of the user.

* * * * *